Jan. 15, 1935.  C. W. ROBBINS  1,987,710
ADVERTISING PROJECTING MACHINE
Filed March 30, 1933  2 Sheets—Sheet 1
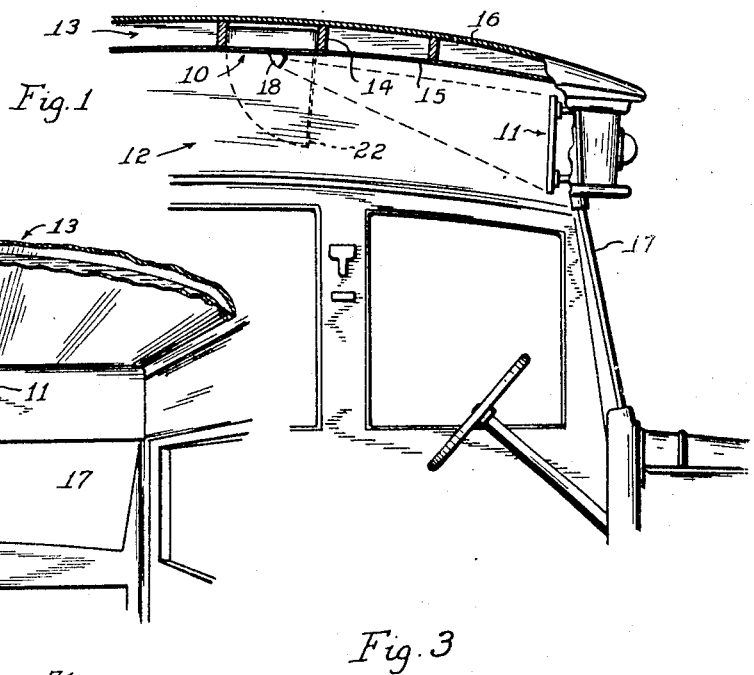
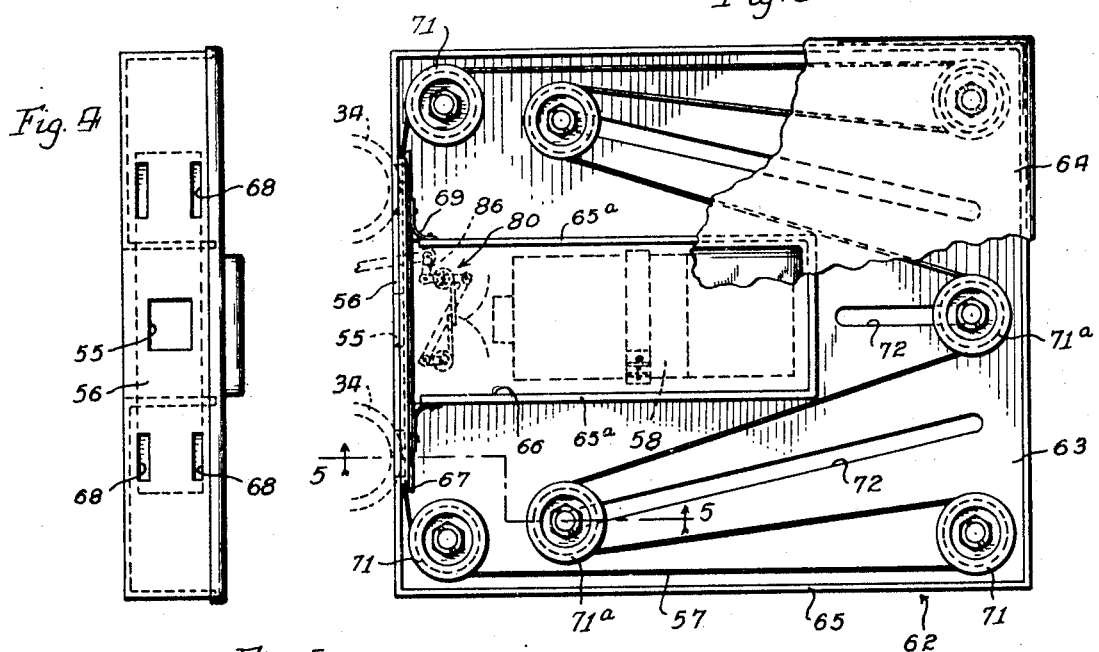
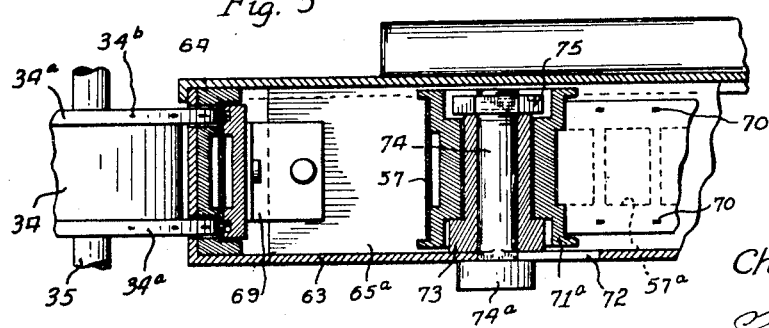
Inventor:
Charles W. Robbins
Fred Bing
Attorney Jan. 15, 1935.  C. W. ROBBINS,  1,987,710
ADVERTISING PROJECTING MACHINE
Filed March 30, 1933   2 Sheets-Sheet 2
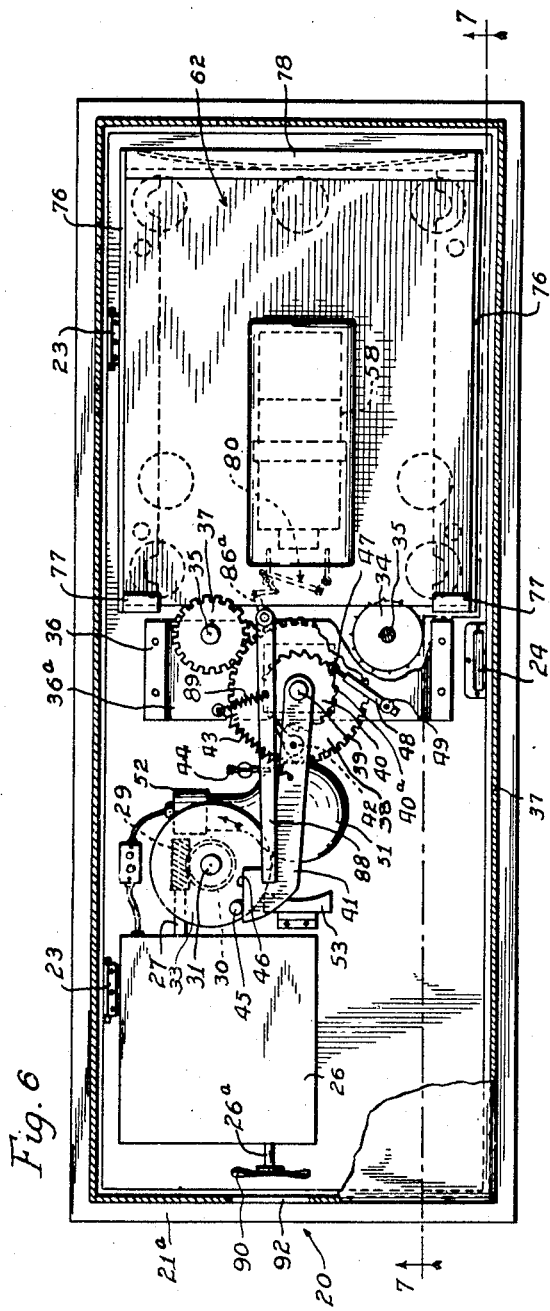
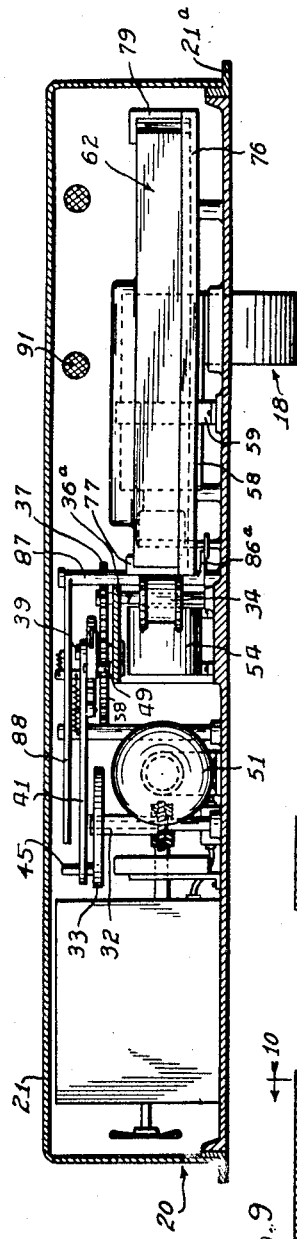
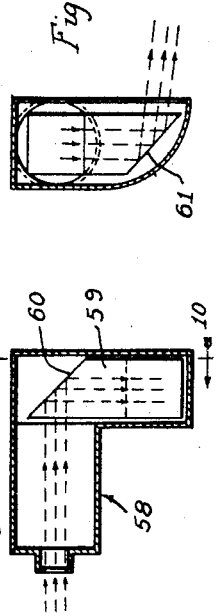
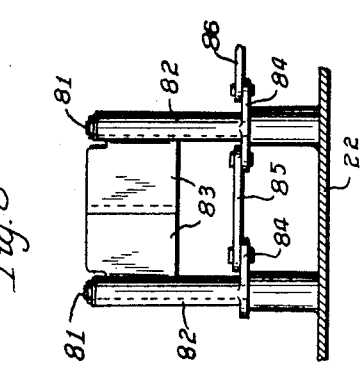
Inventor:
Charles W. Robbins
Ferd Bing.
Attorney Patented Jan. 15, 1935

1,987,710

UNITED STATES PATENT OFFICE 1,987,710

ADVERTISING PROJECTING MACHINE

Charles W. Robbins, Chicago, Ill.

Application March 30, 1933, Serial No. 663,446

18 Claims. (Cl. 88—24)

The invention relates generally to advertising projecting machines and more particularly to such machines adapted for use in buses and similar vehicles.

An important object of the invention is to provide a machine of this character which is compact and rugged in construction and adapted for mounting in a substantially concealed position in a bus or the like.

Another object is to provide such a machine having a novel optical system which contributes to the compactness of the machine.

Another object is to provide such a machine embodying a removable film magazine associated in a novel manner with the other elements of the device whereby to simplify servicing of the machine.

A further object of the invention is to produce a machine having a novel and rugged shutter construction operable to introduce an element of suspense into the projecting operation so as to obtain a sustained interest from the spectators.

Other objects and advantages will become apparent from the following description taken in connection with the accompanying drawings which illustrate a preferred embodiment of the invention, and in which:

Fig. 1 is a fragmental view taken in central longitudinal section through a bus equipped with a projector embodying the features of the invention.

Fig. 2 is a transverse sectional view looking forwardly in the passenger compartment of the bus shown in Fig. 1.

Fig. 3 is a plan view of the film magazine of the projector shown in Figs. 1 and 2.

Fig. 4 is a left end view of the film magazine shown in Fig. 3.

Fig. 5 is a fragmental sectional view taken along the line 5—5 of Fig. 3.

Fig. 6 is a plan view of the projector with the upper section of the casing removed.

Fig. 7 is a vertical sectional view of the projector, the view being taken substantially along the line 7—7 of Fig. 6.

Fig. 8 is an enlarged detail view of the shutter.

Figs. 9 and 10 are diagrammatic views showing a part of the optical system, Fig. 10 being taken along the line 10—10 of Fig. 9.

As herein illustrated the invention is embodied in a projector 10 adapted for projecting an image upon a rectangular screen 11 located at the front of the passenger compartment 12 of a bus. The compartment 12 customarily has a low ceiling provided by a top 13 and the projector 10 therefore is arranged to be mounted within the top. As shown in Fig. 1 the top 13 is formed by a series of spaced transverse ribs 14 with inner and outer coverings 15 and 16 secured thereto. With this construction the projector is located between two of the ribs 14 a substantial distance rearwardly from the front wall or windshield 17, upon the upper portion of which wall the screen 11 is fixed. Since the distance between the inner and outer top coverings 15 and 16 of the top is relatively small the projector 10 is relatively shallow so that its lower surface may be positioned substantially flush with the inner covering 15. When in this position the projector 10 presents a neat appearance, and to provide an outlet for the optical system of the device, a relatively small projection 18 extends a short distance downwardly from the projector 10.

The projector 10 is housed in a sectional box-like casing 20 of rectangular shape which conforms with the space between the ribs 14 and the inner and outer top coverings 15 and 16, and the casing is positioned in the top so that its greatest dimension extends transversely of the bus. In mounting the casing in the top its upper section 21 is secured to the adjacent ribs 14, the section 21 being of an inverted pan-like form with an open lower face, Figs. 1 and 7. To secure the section 21 in place, angles 21ª fixed to the lower edge of the section 21 are secured to the ribs 14 by any preferred means of a conventional character. The casing 21 is completed by a closure or bottom plate 22 which is preferably pivoted by hinges 23 to one of the lower edges of the section 21, a releasable catch 24 being provided on the other side of the section 21 to hold the plate 22 in horizontal closing relation to the upper section.

Preferably, the pivoted bottom plate 22 is utilized to carry the mechanism of the machine so as to simplify its manufacture and assembly as well as the servicing and inspection of the machine. Thus the release of the catch 24 permits downward swinging movement of the plate 22 to the position shown in dotted outline in Fig. 1, in which position the mechanism carried by the plate 22 is readily accessible.

In arranging and mounting the various elements of the machine on the plate 22 the ease and rigidity of mounting as well as adjustment and replacement are essential considerations upon the basis of which the actuating mechanism has been segregated at one end of the plate while the film supporting means is located at the other end of the plate. Thus a constantly driven electric motor housed in a casing 26 with suitable reduction gearing (not shown), is mounted at the left end of the plate (Fig. 6) with a terminal or driven shaft 27 of the reduction gearing projecting from one side of the casing parallel to the plate 22 and generally toward the center of the plate. At its extreme end the shaft 27 carries a worm 29 which engages with a horizontally positioned worm wheel 30. To support the worm wheel 30, a shaft 31 is fixed at its lower end in the plate 22 and projects upwardly from the plate.

The shaft 31 is shouldered to support the work wheel 30 at the proper level, the worm wheel being fixed to the lower end of a bearing sleeve 32 which is rotatable on the shaft 31.

At its upper end the sleeve 32 carries a relatively large disk 33 which is spaced a substantial distance from the base plate 22 so as to provide clearance for other elements of the device as will hereinafter appear. The disk 33, is constantly driven at a predetermined rate by the motor 26 and constitutes the actuating element of the intermittent drive for the film. This drive includes a pair of film engaging sprockets 34 fixed on parallel shafts 35 which extend upwardly from the base plate 22 adjacent to the center thereof, the shafts 35 being positioned in a plane which extends transversely of the base plate 22. At their lower ends the shafts 35 are rotatably supported in the plate 22 while their upper ends are journalled in and projected through the transverse web 36ª of a U-shaped bracket 36 fixed to the plate 22. Upon upper ends of the shafts 35 gears 37 are fixed to drive the sprockets 34.

A large gear 38 engaging both of the gears 37 is utilized to drive the sprockets 34 in unison, the gear 38 being mounted above the web 36ª on a rotatable stub shaft 39 journalled in the web 36ª of the bracket 36.

Above the gear 38, the stub shaft 39 carries a ratchet 40 which is fixed to the gear 38 for rotating the same. A lever 41 pivoted on the shaft 39 above the ratchet 40 carries a pawl 42 yieldingly pressed into engagement with the teeth 40ª of the ratchet 40 so that the ratchet may be actuated by pivotal movement of the lever 41. A contractile spring 43 acting between the bracket 36 and the lever 41 serves to move the lever in a clockwise direction about its pivot 39 and into abutment with an adjustable stop 44, in which movement the ratchet 40 is rotated and the film sprockets 34 actuated through a partial rotation.

In order that the lever 41 may be periodically actuated, its remote or free end extends across the upper surface of the constantly rotating disk 33 and normally lies in the path of an upstanding roller 45 mounted adjacent to the periphery of the disk. Thus in each revolution of the disk 33, the roller 45 strikes a cam surface 46 formed on the edge of the lever 41 so as to move the lever and tension the spring 43. The range of such movement of the lever is governed by adjustment of the stop 44 so that the return of the lever moves the film sprockets 34 through the desired angle.

During the idle movement of the lever 41 and the pawl 42, the ratchet 40 is held in position by a roller 47 carried by a leaf spring 48 and pressed thereby into the notch between adjacent teeth 40ª of the ratchet 40. By mounting the leaf spring on a square transverse bolt 49 and adjustably mounting the bolt in a slot in the web 36ª, the normal position of the roller 47 may be varied.

This construction permits adjustment of the film position as will hereinafter appear.

In the space beneath the disk 33 an incandescent lamp 51 is mounted with its filament on substantially the longitudinal center line of the casing, the base of the lamp being mounted in a standard 52 adjacent to the pivoted edge of the plate 22. Electrical connections of a conventional character are made through the standard 52. A concave reflector 53 mounted on the plate 22 between the lamp 51 and the motor serves to reflect the light from lamp longitudinally along the axis of the plate 22 into a condensing lens unit 54 mounted on the plate 22 between the sprockets 34 and beneath the bracket 36.

The condensing lens unit 54 comprises a part of the optical system of the device, and projects the light through a film gate 55 (Figs. 4 and 5) formed in a film guide 56, thus projecting the image from a film 57 into another lens unit 58 of the optical system, the unit 58 being mounted by means of a clamp 59 between the sprockets 34 and the right hand end of the plate 22.

As shown in Figs. 9 and 10, the lens unit 58 includes a vertical prism 59 which extends downwardly into the projection 18 of the plate 22. At its upper end the prism 58 has an angularly positioned reflecting surface 60 which projects the light rays downwardly as indicated by the arrows, such light rays then striking an angular reflecting surface 61 formed at the lower end of the prism so as to reflect the rays forwardly of the bus to the screen 11.

As will be evident in Figs. 3, 5 and 6, the film 57 runs through the guide 56 in a vertical plane, and the frames 57ª (Fig. 5) of the film are located with their greatest dimension extending in a vertical direction. The optical system above described serves to change the position of the image so that when it is projected onto the screen 11, the image is located in a substantially vertical plane with its greatest axis extending transversely of the bus in a horizontal direction. Thus it is possible with the present machine to use standard 16 m. m. film with its conventional shape and location of frames, whereby to obtain the desired number of pictures on the minimum amount of film. Also, the use of a standard film reduces the cost of using the machine.

Means, in addition to the guide 56, is provided for supporting the film 57. This means preferably comprises a removable film magazine 62, shown in detail in Figs. 3 and 5, by virtue of which the film may be easily mounted in and removed from the machine. The magazine 62 is of box-like form with a base section 63 and a removable cover 64. The base section 63 has side walls 65 and 65ª which define a central opening 66 to provide clearance for the lens unit 58 of the optical system. Thus the base section 63 is of generally U-shaped form, in horizontal cross section, and the film guide 56 is mounted on one of the side walls 65 so as to extend across the open end of the U and provide for passage of the film 57 across the open end of the U.

As shown in Figs. 3 and 5, the guide 56 embodies a retractible pressure shoe 67 which holds the film 57 in position in the guide adjacent the film gate 55 and driving slots 68 which are formed in the guide. The shoe 67 is preferably carried by springs 69 secured to the inner side walls 65ª, the wall 65ª being terminated short of the guide 56 as shown in Fig. 5 so that the shoe 67 may be retracted for a sufficient distance to permit upward withdrawal of the film 57.

In Fig. 5 the form of the film sprockets 34 is also shown, each sprocket having longitudinally spaced flanges 34a, which project into the driving slots 68, and carry radially projecting pins 34b to engage the slots 70 formed along the edges of the film.

With standard 16 m. m. film, one slot 70 is provided for each frame 57a, and hence the slots are spaced a relatively great distance apart. To insure proper tractive engagement of the drive with the film 57, the spacing of the pins 34b, and the spacing between the axes of the sprockets 34 are coordinated so that one sprocket has a pin 34b fully engaged with one of the slots 70 at all times. Thus in the present case, the sprockets are mounted with their axes spaced a distance equal to four and one-half times the arcute distance between adjacent sprocket pins 34b.

Within the magazine 62 a plurality of substantially similar guide spools 71 and 71a (Figs. 3 and 5) are mounted to support the film 57, which is, of course, in the form of a continuous loop so as to provide for repetition of the various advertisements carried thereby. The spools 71 and 71a guide the film 57 about the two sides of the U shaped casing and between the opposite ends of the guide 56, various arrangements being possible as determined by the length of the loop. Thus, in the present instance three rollers 71a are mounted for adjustment in slots 72 formed in the base section 63 of the magazine. The spools 71a are each carried on a sleeve 73 (Fig. 5) which surrounds the inner end of a bolt 74 projecting into the casing through one of the slots 72. At its upper end the bolt 74 has a nut 75 which may be tightened against the top of the sleeve to clamp the sleeve and the head 74a of the bolt to the bottom of the section 63.

To support the magazine on the base plate 22 a pair of angles 76 (Figs. 6 and 7) are mounted on the plate so as to extend longitudinally along opposite sides of the plate. The angles 76 engage the opposite sides and bottom of the magazine 62 so as to position the same laterally, while channels 77 and 78 at the ends of the angles 76 engage the ends of the magazine 62 to hold the magazine against upward displacement. As shown in Figs. 6 and 7, the channels 77 are located only at the corners of the magazine adjacent to the sprockets 34, while the channel 78 extends entirely across the other end of the magazine and is relatively deep.

In the channel 78 a bow spring 79 is mounted which acts to press the magazine toward the channels 77 and the sprockets 34 whereby to maintain the desired operative relationship of the film and the sprockets. To remove the magazine, it is shifted to the right (Fig. 6) to release it from the channels 77 and the sprockets 34. The left end of the magazine is then lifted away from the angles 76, after which the entire magazine may be shifted to the left to release it from the channel 78. In mounting a magazine in the machine the order of the above operations is reversed.

In the use of an advertising device of this character it is important to obtain a sustained interest from the spectators. This end is obtained in the present device by a novel shutter mechanism, designated generally by the reference numeral 80 in Figs. 3 and 6, and positioned between the film gate 55 and the lens unit 58. The shutter mechanism 80 is so positioned as to be enclosed in the central space 66 of the magazine 62 and is operated in timed relation to the film actuating mechanism by the disk 33.

The shutter mechanism 80 is shown in detail in Fig. 8 and comprises a pair of shafts 81 mounted in and extending upwardly on opposite sides of the film gate 55 (Fig. 3). On each shaft 81 a sleeve 82 is rotatably mounted, each sleeve 82 having a plate 83 projecting therefrom in a radial plane. The plates 83 may be moved to overlapping positions as shown in Fig. 3, so as to cut off the light from the lamp or may be opened as in Fig. 6 to allow the image to be projected to the screen 11. By means of arms 84 at the lower ends of the sleeves 82 and a connecting link 85, the sleeves 82 are arranged for simultaneous rotation in opposite directions.

To actuate the sleeves 82, a link 86, connected to one of the arms 84, is connected to an arm 86a of a bell crank, the bell crank being formed (Fig. 7) by the arm 86a, a vertical sleeve 87 to the lower end of which the arm 86a is fixed, and a lever arm 88 connected to the upper end of the sleeve 87.

The lever arm 88 projects from the sleeve 87 so that its free end overlies the disk 33 and is positioned in the path of the roller 45, and a spring 89 acting between the bracket 36 and the arm 88 serves to draw the arm into the path of the roller and against a part of the stop 44. When the arm 88 is in this position the shutter 80 is open as shown in Fig. 6.

It will be evident that in the rotation of the disk 33 the roller 45 first strikes the cam surface 46 of the lever 41, thereby moving the pawl 42 through its idle movement and tensioning the spring 43. During the terminal portion of this movement of the lever 41, the roller 45 strikes the side of the lever arm 88 so as to impart a closing movement to the shutter 80. As soon as the shutter 80 is closed, the roller 45 passes off of the end of the cam surface 46 and permits rapid actuation of the film sprockets 34 by the spring 43 and the associated ratchet mechanism.

The roller 45 then moves gradually along the edge of the lever arm 88 so as to permit gradual opening movement of the shutter 80. Such gradual opening of the shutter, of course, results in gradual disclosure of the image on the screen 11 whereby to sustain the interest of the spectators and thereby enhance the advertising value of the machine.

During operation the machine is cooled by a fan 90 fixed on the projecting motor shaft 26a, the fan serving to draw cool air in through screened inlet openings 91 in the casing to replace warm air expelled from an outlet opening 92.

The present machine is particularly advantageous for the reason that the elements are of rugged and compact construction, and yet the machine is such that it may be readily serviced, inspected or adjusted. For example, the lamp 51 may be easily removed, the rest position of the film may be easily varied to provide proper framing of the image, or the range of movement of the film varied by adjustment of the stop 44.

Moreover, the compact structure of the device with the prismatic optical system permits use of the machine in a bus without materially reducing the head room therein. This positioning of the machine in the uppermost part of the bus top serves to shield the light rays to the maximum from outside light interference.

The construction is such that a standard 16 m. m. film may be employed, renders the machine economical in use and reduces the length of film to the minimum.

By the hinged construction of the base plate the servicing of the machine is simplified, while the provision of a film magazine which may be readily removed facilitates the changing of the film and avoids possible damage thereto.

I claim as my invention:

1. In a bus or the like having a top wall consisting of spaced inner and outer coverings, the combination of a projecting machine having a casing located in said top wall between said inner and outer coverings with its lower surface substantially flush with the inside of said inner covering, film supporting and actuating means in said casing, and an optical system located principally within said casing and including a light reflecting means extending a short distance downwardly from the lower surface of the casing, said part of the optical system being operable to reflect an image in a generally horizontal direction from the machine.

2. In an advertising projecting machine, the combination of a casing having an upper section adapted to be permanently mounted in the roof of a bus or the like and a movable bottom closure section for the bottom of the casing, an optical system mounted on one of said sections and terminating in a reflecting element positioned below the normal level of said closure section, mechanism on said one of said sections for imparting intermittent motion to a film, and a film magazine adapted for removable mounting in said casing with its film in operative association with said mechanism.

3. In an advertising projecting machine the combination of a casing having an upper section adapted to be permanently mounted in the roof of a bus or the like, and a movable bottom closure section for the bottom of the casing, an optical system fixed on one of said sections, a pair of film actuating sprockets on opposite sides of one axis of said system, a removable film magazine having means along one side thereof providing a film gate and guide and having apertures therein through which said sprockets may project into engagement with the film, and means in said magazine for supporting and guiding a continuous loop of film.

4. A machine of the character described comprising a casing, film actuating mechanism, an optical system mounted substantially centrally in said casing, and a separately formed removable film magazine shaped to provide a walled central space within which is located a part of said optical system and having means therein for supporting a continuous loop of film in operative association with said actuating mechanism, said film loop being separated from said part of the optical system by the walls of said central space.

5. An advertising projecting machine comprising a casing, film actuating means in said casing, an optical system in said casing including a light source, a projecting lens and light deflecting means, and means for supporting a continuous loop of film in operative association with said mechanism for actuation thereby with said light source outside of said loop, said film supporting means being arranged to support said loop of film in surrounding relation to said lens and a part of said light deflecting means.

6. An advertising projector for buses and the like, said projector comprising a housing adapted to be mounted in the roof of a bus with its lower face open, a mounting plate pivoted to said housing and adapted to swing downwardly from a normal closed relation, and a film actuating mechanism, an optical system, and a shutter actuated in timed relation to said mechanism, all mounted on the inner side of said plate so as to be enclosed in said housing when the plate is in its closed position.

7. An advertising projector for busses and the like, said projector comprising a housing adapted to be mounted in the roof of a bus with its lower face open, a mounting plate pivoted to said housing and adapted, to swing downwardly from a normal closed relation, film-actuating mechanism, an optical system, and a shutter actuated in timed relation to said mechanism, all mounted on the inner side of said plate so as to be enclosed in said housing when the plate is in its closed position, and a film magazine detachably associated with said system, said shutter and said mechanism and adapted for removal when said plate is lowered from closing relation to the housing.

8. A projecting machine having a main housing, film actuating mechanism and an optical system therein, a removable film magazine adapted to be placed in said housing in operative association with said mechanism, a support for said magazine comprising a standard along which the magazine may slide toward and away from said mechanism, hook shaped means operable to hold the magazine on said standard and with which said magazine is operatively associated by longitudinal movement along said standard toward said mechanism, and spring means acting to impart such movement to the magazine to retain the same in position.

9. An advertising projector comprising a flat rectangular casing adapted for mounting in the top of a bus or the like with the longitudinal axis of the casing extending transversely of the bus, a continuous loop of film having individual frames with their greatest dimension extending transversely of the film, means for supporting said film in said casing, said means comprising a plurality of guide spools rotatable about vertical axes, and an optical system for projecting an image from said film longitudinally of the casing, said system including means to project such an image in a vertical plane to the forward end of the bus with the greatest dimension of the image extending transversely of the bus in a horizontal direction.

10. An advertising projecting machine comprising a casing adapted for mounting within the roof of a bus or the like, film supporting and actuating means in the casing, an optical system adapted to project an image from the film along substantially horizontal axis within the casing, said system including reflecting means in the casing to project said image downwardly below the level of said casing and to project said image along a substantially horizontal axis beneath and away from the casing.

11. A projecting machine comprising a flat rectangular casing, a film magazine positioned in one end of said casing and having a film gate and guide in the end thereof adjacent the center of said casing, a pair of film actuating sprockets mounted on opposite sides of said gate and projecting into said guide, a gear operatively connected to both of said sprockets, a pawl and ratchet mechanism for actuating said gear, a lever connected to said pawl for actuating the same, a rotatable disk, means for rotating said disk at a constant rate, interacting cam surfaces on said disk and on said lever to actuate said lever when said disk is rotated.

12. A projector comprising a flat casing, a constant speed motor therein, a disk mounted in said casing for rotation about an axis located perpendicular to the large side of said casing, a pair of pivoted levers, means on said disk adapted to engage and pivot said levers, a spring urging said levers into the path of said means, a shutter actuated by one of said levers, and film advancing mechanism actuated by the other one of the levers.

13. In a projecting machine having film supporting means and a film guide adapted to support a loop of film, the combination of a film having equidistantly spaced driving slots therein, a pair of driving sprockets located outside of the film loop and having equidistantly spaced radial pins for engaging said slots to actuate the film, and means for supporting and driving said sprockets in unison to engage the teeth of said sprockets with the film alternately.

14. In a projecting machine the combination of film supporting means and a film guide adapted to support a loop of film, a pair of actuating sprockets on parallel axes spaced longitudinally of the film guide and located outside of the film loop, a plurality of radially projecting pins on said sprockets, equidistantly spaced peripherally of the sprockets a predetermined distance from each other, said axes of the sprockets being spaced apart a distance which is equal to a fractional multiple of the said predetermined peripheral distance between sprocket pins.

15. A film magazine for advertising projectors, said magazine comprising a flat casing formed to provide, in a horizontal cross section, a generally U shaped chamber with an open space between the sides of the U, and means extending across permanently associated with the open end of said U to form a film guide through which a film may pass in enclosed and protected relation from one side of the U to the other.

16. A film magazine for advertising projectors, said magazine comprising a flat casing formed to provide, in a horizontal cross section, a generally U shaped chamber with an open space between the sides of the U, and means extending across the open end of said U to form a film guide through which a film may pass from one side of the U to the other, said guide having a pressure shoe, and spring means attached to the inner walls of the casing at the inner side of the U and acting to press the shoe against the opposing portion of the guide.

17. An advertising still-picture projecting machine having a housing, film supporting and an optical system in said housing, means in said housing for imparting step-by-step movement to the film, said means providing relatively short periods of movement alternating with relatively long periods of dwell, a shutter for interrupting the light in said optical system during such periods of film movement, and actuating mechanism for said shutter operable in timed relation to said film actuating means to open said shutter relatively slowly after completion of the film movement.

18. A projecting machine comprising a casing having an optical system mounted therein including a light source, a lens and reflecting means, said light source and said lens being spaced apart, film-actuating means including a film-engaging element located in the space between said lens and said light source, a removable film magazine adapted to completely enclose and protect an endless loop of film and having a walled recess formed therein to provide space to receive said lens, and a film guide forming a part of said magazine and extending across one end of said recess to house and guide the film across the space between said light source and the lens, said guide having a film gate formed therein and a slot through which said film-engaging element may extend from the outside of the magazine to actuate the loop of film.

CHARLES W. ROBBINS.